UNITED STATES PATENT OFFICE.

HARRY W. JORDAN, OF SYRACUSE, NEW YORK, ASSIGNOR TO THE PITTSBURGH REDUCTION COMPANY, OF PITTSBURG, PENNSYLVANIA, A CORPORATION OF PENNSYLVANIA.

METHOD OF MAKING ALUMINIUM HYDRATE.

SPECIFICATION forming part of Letters Patent No. 691,470, dated January 21, 1902.

Application filed July 10, 1901. Serial No. 67,792. (No specimens.)

*To all whom it may concern:*

Be it known that I, HARRY W. JORDAN, of Syracuse, Onondaga county, New York, have invented a new and useful Improvement in the Manufacture of Aluminium Hydrate, of which the following is a full, clear, and exact description.

My invention relates to an improvement in the manufacture of aluminium hydrate by a process wherein the hydrate is precipitated from sodium-aluminate solution by carbonic-acid gas. In such processes aluminium hydrate is precipitated from the aluminate liquor according to the following formula:

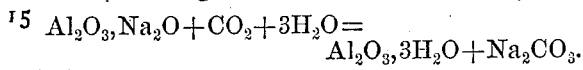

$$Al_2O_3,Na_2O + CO_2 + 3H_2O = Al_2O_3,3H_2O + Na_2CO_3.$$

The precipitation of the hydrate is carried on in a vessel known as an "agitator," consisting of a horizontal cylinder fitted with rotating paddles and having an inlet and outlet pipe for the passage of $CO_2$ gas. Heretofore the precipitation has been carried on generally at from 160° Fahrenheit to 170° Fahrenheit, and even with the exercise of great care it has been found that there is precipitated with the aluminium hydrate an insoluble sodium compound which varies in amount from three per cent. to seven per cent. of the whole. It can be removed in part by washing with dilute sulfuric acid; but this adds to the expense and contaminates the aluminium hydrate with objectionable sulfate. I have discovered that if the $CO_2$ gas be superheated above 200° Fahrenheit, above the normal boiling-point of the solution, and preferably to a temperature of 400° Fahrenheit before being introduced into the agitator, greatly-improved results are obtained, the proportion of insoluble sodium carbonate is greatly reduced, and the washing with acid rendered unnecessary. With $CO_2$ gas heated to about 280° Fahrenheit I have obtained aluminium hydrate having an average of about 1.32 per cent. of insoluble sodium carbonate, and with $CO_2$ gas heated to about 400° Fahrenheit I have obtained an average of only about .43 per cent. of insoluble sodium carbonate.

The means by which my invention is put in practice may be varied, since

What I claim is—

1. The method herein described of making aluminium hydrate, which consists in preheating $CO_2$ gas to a temperature above 200° Fahrenheit and bringing it into contact with the aluminate solution, substantially as described.

2. The method herein described of making aluminium hydrate, which consists in preheating $CO_2$ gas to a temperature above the normal boiling-point of the aluminate solution to be treated, and bringing the gas into contact with such solution, substantially as described.

In testimony whereof I have hereunto set my hand.

HARRY W. JORDAN.

Witnesses:
MORRIS W. CHASE,
ALBERT C. PHILLIPS.